(12) United States Patent
Scherzer et al.

(10) Patent No.: US 10,000,014 B2
(45) Date of Patent: Jun. 19, 2018

(54) METHOD FOR PRODUCING THERMOPLASTIC FOAM PANELS BY MEANS OF AT LEAST TWO HEATING ELEMENTS OFFSET IN PARALLEL WITH EACH OTHER

(71) Applicant: BASF SE, Ludwigshafen (DE)

(72) Inventors: Dietrich Scherzer, Neustadt (DE); Tim Diehlmann, Grünstadt (DE); Franz-Josef Dietzen, Haßloch (DE); Carsten Sandner, Bad Dürkheim (DE); Herbert Schall, Römerberg (DE)

(73) Assignee: BASF SE, Ludwigshafen (DE)

( * ) Notice: Subject to any disclaimer, the term of this patent is extended or adjusted under 35 U.S.C. 154(b) by 339 days.

(21) Appl. No.: 14/906,938

(22) PCT Filed: Jul. 17, 2014

(86) PCT No.: PCT/EP2014/065400
§ 371 (c)(1),
(2) Date: Jan. 22, 2016

(87) PCT Pub. No.: WO2015/011016
PCT Pub. Date: Jan. 29, 2015

(65) Prior Publication Data
US 2016/0159001 A1    Jun. 9, 2016

(30) Foreign Application Priority Data

Jul. 24, 2013  (EP) .................................... 13177902

(51) Int. Cl.
*B29C 65/14* (2006.01)
*B29C 65/82* (2006.01)
(Continued)

(52) U.S. Cl.
CPC ...... *B29C 65/1467* (2013.01); *B29C 65/1412* (2013.01); *B29C 65/1432* (2013.01);
(Continued)

(58) Field of Classification Search
CPC ........... B29C 65/1467; B29C 65/1412; B29C 65/1432; B29C 65/8215; B29C 66/1122;
(Continued)

(56) References Cited

FOREIGN PATENT DOCUMENTS

DE      4421016 A1    12/1995
DE     10106341 A1     7/2002
(Continued)

OTHER PUBLICATIONS

Gausepohl, H., et al., "Herstellung von extrudierten Polystyrol-Hartschaumstoffen", Kunststoffhandbuch 4, Hanser-Verlag Munich, 1996, pp. 591-598.
(Continued)

*Primary Examiner* — Daniel McNally
(74) *Attorney, Agent, or Firm* — Drinker Biddle & Reath LLP (57) ABSTRACT

The present invention relates to a process for the production of at least two-layer thermoplastic foam sheets via thermal welding of at least two thinner thermoplastic foam sheets. In the process of the invention, at least two heating elements are conducted on mutually offset planes between the surfaces to be welded of the thinner thermoplastic foam sheets, and the foam sheets here do not touch the heating elements. The number of layers of the thermoplastic foam sheet is per se a result of the number of thinner thermoplastic foam sheets that are thermally welded to one another. If by way of example three thinner thermoplastic foam sheets are thermally welded to one another, a three-layer thermoplastic foam sheet is per se obtained, and if there are four thinner thermoplastic foam sheets the result is accordingly per se a four-layer thermoplastic foam sheet.

21 Claims, 3 Drawing Sheets

(51) Int. Cl.
  *B29C 65/00* (2006.01)
  *B29C 65/78* (2006.01)
  *B29K 105/00* (2006.01)
  *B29K 25/00* (2006.01)

(52) U.S. Cl.
  CPC ...... *B29C 65/8215* (2013.01); *B29C 66/1122* (2013.01); *B29C 66/45* (2013.01); *B29C 66/727* (2013.01); *B29C 66/7352* (2013.01); *B29C 66/73921* (2013.01); *B29C 65/1425* (2013.01); *B29C 65/1483* (2013.01); *B29C 65/7847* (2013.01); *B29C 66/71* (2013.01); *B29C 66/735* (2013.01); *B29C 66/7313* (2013.01); *B29C 66/73772* (2013.01); *B29C 66/73774* (2013.01); *B29C 66/919* (2013.01); *B29C 66/91933* (2013.01); *B29C 66/91943* (2013.01); *B29C 66/939* (2013.01); *B29C 66/949* (2013.01); *B29K 2025/06* (2013.01); *B29K 2105/0026* (2013.01)

(58) Field of Classification Search
  CPC ... B29C 66/45; B29C 66/727; B29C 66/7352; B29C 66/73921
  See application file for complete search history.

(56) References Cited

FOREIGN PATENT DOCUMENTS

| | | | |
|---|---|---|---|
| DE | 102012023181 A1 | 5/2014 | |
| EP | 1213119 A2 | 6/2002 | |
| EP | 1318164 A1 | 6/2003 | |
| EP | 1566490 A1 | 8/2005 | |
| EP | 2578381 A1 * | 4/2013 | ......... B29C 65/1432 |
| EP | 2669072 A1 | 12/2013 | |
| EP | 2669073 A1 | 12/2013 | |
| EP | 2687353 A1 | 1/2014 | |
| EP | 2687354 A1 | 1/2014 | |
| EP | 2703142 A1 | 3/2014 | |
| JP | 2012232564 A | 11/2012 | |
| WO | WO-99/47621 A1 | 9/1999 | |
| WO | WO-012/1725 A1 | 3/2001 | |
| WO | WO-2006/050013 A2 | 5/2006 | |
| WO | WO-2009/047487 A1 | 4/2009 | |
| WO | WO-2009071499 A1 | 6/2009 | |
| WO | WO-2012/016991 A1 | 2/2012 | |

OTHER PUBLICATIONS

International Search Report for PCT/EP2014/065400 dated Oct. 10, 2014.

* cited by examiner

METHOD FOR PRODUCING THERMOPLASTIC FOAM PANELS BY MEANS OF AT LEAST TWO HEATING ELEMENTS OFFSET IN PARALLEL WITH EACH OTHER

CROSS-REFERENCE TO RELATED APPLICATIONS

This application is a national stage application (under 35 U.S.C. § 371) of PCT/EP2014/065400, filed Jul. 17, 2014, which claims benefit of European Application No. 13177902.7, filed Jul. 24, 2013, both of which are incorporated herein by reference in their entirety.

The present invention relates to a process for the production of at least two-layer thermoplastic foam sheets via thermal welding of at least two thinner thermoplastic foam sheets. In the process of the invention, at least two heating elements are conducted on mutually offset planes between the surfaces to be welded of the thinner thermoplastic foam sheets, and the foam sheets here do not touch the heating elements. The number of layers of the thermoplastic foam sheet is per se a result of the number of thinner thermoplastic foam sheets that are thermally welded to one another. If by way of example three thinner thermoplastic foam sheets are thermally welded to one another, a three-layer thermoplastic foam sheet is per se obtained, and if there are four thinner thermoplastic foam sheets the result is accordingly per se a four-layer thermoplastic foam sheet.

EP-A 1 318 164 relates to a process for the production of thick extruded polystyrene foam sheets (XPS sheets) via bonding of two or more thin sheets. The thick sheets are obtained by uniformly wetting the areas that are to be bonded on the thin sheets with an organic solvent for polystyrene. This causes solvation of the foam surface, and the sheets can than be pressed against one another. Examples of suitable solvents are hydrocarbons, alcohols, or ethers with a boiling point of from 50 to 250° C. In the process according to EP-A 1 318 164 it is moreover possible that the foaming skins on the main areas of the sheets that are to be bonded to one another are peeled before the sheets are wetted with the solvent.

EP-A 1 213 119 discloses a process for the bonding of at least two input sheets made of thermoplastic foam to give a new sheet, where the input sheets have no extrusion skin at the contact areas, and the bonding of the input sheets is achieved via solvation welding. The solvation welding process uses organic solvents with boiling point <150° C., for example acetone, or a mixture of organic solvents with water.

DE-A 101 063 41 discloses extruded plastic foam sheets of high thickness. The process described therein for the bonding of at least two input sheets made of plastic foam to give a new sheet can produce sheets with a minimum thickness of 70 mm. Preference is given here to polystyrene foam sheets free from fluorochlorocarbons. The input sheets, which have no extrusion skin on the contact area, are bonded to one another in the process by use of an adhesive that does not prevent diffusion, or of mechanical bonding elements. Alternatively, in the event of partial-area bonding and local welding, or local adhesive bonding, the process can also be carried out with use of an adhesive not amenable to diffusion, or an adhesive amenable to only a low level of diffusion. Particularly suitable polystyrene foam sheets are XPS sheets. However, DE-A 101 063 41 comprises no information about any specific method for the welding, instead of adhesive bonding, of the input sheets.

DE-A 44 21 016 discloses a process for the production of $CO_2$-foamed plastic sheets of high thickness, in particular made of polystyrene and/or polyethylene, where doubling of the corresponding input sheets is achieved via thermal welding. The thermal welding process uses a heating rod, and the surfaces of the plastic foam sheets used are thus incipiently melted. The input sheets to be welded are drawn across the heating rod, and direct contact occurs here between heating rod and input sheets. The heating rod preferably has a Teflon layer, and can be brought to the necessary welding temperature electrically or by passage of a hot fluid, said temperature being from 100 to 150° C., depending on the plastic foam.

WO 2012/016991 describes thermal insulation materials made of XPS composite materials which have three layers. The source of the three layers of the composite materials is the combination of a lower, a central, and an upper XPS sheet to give the XPS composite material, and each externally oriented side of said XPS composite material comprises an extrusion skin. The contact sides of the central XPS sheet likewise have an extrusion skin, but in the case of the corresponding contact sides of the upper, and also lower, XPS sheet this skin is removed. The individual XPS sheets are joined via thermal welding at the contact areas to give the XPS composite material. The thermal welding process preferably uses a heating rod, and also preferably uses direct contact of the heating rod with the XPS sheets to be welded, via movement of the XPS sheets over a rigidly arranged heating rod. The weld formed between the individual XPS sheets can have subregions of different intensity, and this means that the corresponding weld is relatively strong at some locations, and relatively weak at other locations.

EP-A 2 578 381 relates to a process for the production of multilayer plastic sheets, for example XPS, via thermal welding of the corresponding thinner input sheets with use of a two-part heating element. The two-part heating element is of plate design, and the two plate parts are conducted so as to enter from the outside on a plane between the two input sheets to be welded, so that the two plate parts touch and in principle represent a single heating plate of greater size (twice that of the respective plate parts). The thermal welding process is preferably carried out without direct contact between the heating elements and the plastic sheets to be welded. The heating element is kept for a sufficiently long time between the input sheets to be welded. However, EP-A 2 578 381 does not comprise any specific data for the expression "sufficiently long time". Instead, the time is deemed to be sufficient when the input sheets are in essence in a molten condition at the respective surfaces.

U.S. Pat. No. 4,764,328 discloses another process for the production of multilayer thermoplastic foams via thermal welding of correspondingly thinner input sheets. That process uses a single heating plate, which can optionally also take the form of two parts, and involves, during the welding procedure, direct contact between heating plate and the surfaces that are to be welded of the input sheets. Once the surfaces to be welded have been heated, with the use of the heating plate, to the extent that they are liquid, the pressing of the input sheets takes place within a short time. The input sheets can be pressed within less than one second after removal of the heating plates.

DE-A 10 2012 204 822 relates to a process for the durable area-bonding of two sheets of two foamed materials. A first and a second sheet are respectively precisely positioned over one another with the desired orientation and overlap by a conveying device, introduced into a welding unit, and there passed over the length of a separator rod. The positioning of the separator rod between the surfaces facing toward one another on the two sheets produces a gap of defined width. A fixedly installed heating element located in the gap downstream of the separator rod, preferably a heating rod, heats the surfaces facing toward one another on the two sheets via contactless heat transfer in such a way that at least one of said surfaces is softened or is incipiently melted. The two sheets are then joined via elements that apply pressure and that force the two sheets against one another in such a way that the surfaces facing toward one another on these become coherently bonded to one another by virtue of the preceding heat treatment provided by the heating element.

JP 2012 232564 discloses a process for welding thermoplastic materials to other thermoplastic materials, wood, or by way of example paper. Here, two heating elements, connected to one another, are introduced on two mutually parallel planes between the sheets, and the sheets are thus heated. After the removal of the heating element, the sheets are connected to one another by vibration welding.

A fundamental problem with thermal welding is combustibility and compliance with fire tests. Even if the thinner sheets to be welded are incombustible or have only very low combustibility, this cannot automatically be assumed to apply to the resultant product, i.e. the two- or multilayer sheets of greater thickness (than that of the thinner input sheets used). This different fire performance arises from the formation of what is known as the weld during the thermal welding process. The weld is formed at the locations at which the surfaces of the thinner plates used are thermally welded to one another. The presence and, respectively, the thickness of the weld determines whether the B2 fire test (in accordance with DIN 4102-1: 1998-05) is passed or not. As the extent and, respectively, thickness of the weld increases, the flame height increases. This disadvantageous fire performance (in comparison with the thinner input sheets) of the two- or multilayer sheets, due to the presence of a weld, is also termed "wicking effect".

However, if there is no weld, or if only a very thin weld is present the bonding of the respective thinner sheets to one another is not sufficiently strong, and the corresponding product is therefore unstable.

The object underlying the present invention consists in the provision of a novel process for the production of two- or multilayer thermoplastic foam sheets via thermal welding.

The object is achieved via a process for the production of an at least two-layer thermoplastic foam sheet via thermal welding of at least two thinner thermoplastic foam sheets, comprising the following steps a) to e):
 a) two thinner thermoplastic foam sheets are oriented parallel to one another with a separation a, in such a way that they form an intermediate space,
 b) at least two heating elements are introduced on parallel-offset planes, and parallel to the two thinner thermoplastic foam sheets, into the intermediate space, and the surfaces of the two thinner thermoplastic foam sheets here do not touch the heating elements,
 c) the heating elements are introduced between the two thinner thermoplastic foam sheets to an extent such that in relation to every location on the respective surface of the two thinner thermoplastic foam sheets, at least one of the heating elements has been present at least temporarily between the two thinner thermoplastic foam sheets,
 d) the heating elements are removed completely from the intermediate space,
 e) at least one of the two thinner thermoplastic foam sheets is forced against the surface of the respective other thinner thermoplastic foam sheet.

where, in step b), two heating elements are introduced from, in each case, mutually opposite, directions into the intermediate space and/or, in step d), two heating elements are in turn removed in, in each case, mutually opposite directions from the intermediate space.

A feature of the at least two-layer thermoplastic foam sheets produced by the process of the invention is that the corresponding number of thinner thermoplastic foam sheets can be joined in a very stable manner to give the at least two-layer thermoplastic foam sheets (product). Features of the welds which are formed in the process of the invention and which by virtue of the thermal welding process bond the individual thinner thermoplastic foam sheets to give the at least two-layer thermoplastic foam sheet are high stability, and also in particular homogeneity. The welds are homogeneous when there is no change at all, or only a very small change, in the thickness of the weld across the entire extent of the weld.

The process of the invention is fundamentally what is known as "contactless welding" (or "contactless heating"), since the heat transfer from the heating elements to the surfaces to be welded of the thinner thermoplastic foam sheets (also termed "input sheets") takes place without direct contact between heating element and input sheet. This has the advantage that in the process of the invention no (or only very small) depressions or depressed areas are formed on the surfaces of the input sheets to be welded. Said depressed areas are a general problem in particular in the peripheral regions of the input sheets in the case of processes which are based on direct contact between heating element and surface to be welded. These depressions/depressed areas lead to greater inhomogeneity in the weld, and this in turn (as described below) can have a disadvantageous effect on fire performance, and also on the stability of the at least two-layer thermoplastic foam sheets.

Another advantage to be observed, due to the use of at least two heating elements which are used on parallel-offset planes, and without direct contact with the input sheets to be welded, for the purposes of the process of the invention, is that the extent of differences in amounts of heat supplied to the surfaces that are to be welded of the input sheets is much smaller than in processes according to the prior art. When only one heating element is used, which can optionally also be a two-part element, but where the individual parts are conducted on one plane, there are differences in the amount of heat supplied to the individual regions of the respective sheet surface of the input sheets to be welded because, unlike in the process of the invention, in particular the peripheral regions of the input sheets are on average exposed directly or indirectly to the corresponding heat source over a markedly longer period. This in turn affects the homogeneity of the weld.

Another factor that has to be taken into account in this connection is that when movable heating elements are used the dynamic effect of the inward and outward movement of the heating elements draws cold air in behind the heating element between the input sheets to be welded, whereas in contrast, hot air is "pushed out of the intermediate space" in front of the heating element. The plug flow or turbulent flow thus occurring between the sheets to be welded in turn has adverse effects on the homogeneity, and thus stability, of the weld to be formed. By virtue of the inventive use of two movable heating elements on mutually parallel planes, in contrast, air is displaced only to a markedly smaller extent, with no resultant uncontrolled in- and outflow of excessively cold or hot air. In particular when the process of the invention uses two heating elements which are introduced on parallel planes from mutually opposite directions into the intermediate space between the input sheets, the problem of plug flow or turbulent flow can be minimized, and the weld achieved between the input sheets to be welded can be even more homogeneous. This effect can be further amplified when the removal of the two heating elements also takes place in respectively opposite directions. It is particularly advantageous here that the individual sheets are moved in and out without change of direction, because this permits faster conduct of the process of the invention in comparison with a variant with reversal of direction of the two heating elements between the outward-movement step and the inward-movement step.

A further advantage is discernible in the process of the invention in that there are no required restrictions in respect of the thickness of the input sheets. In contrast to this, processes according to the prior art, for example those disclosed in DE-A 10 2012 204 822, can only process input sheets with a maximum thickness of from 80 to 100 mm, because at least one of the input sheets is bent at a sharp angle during the thermal welding process, since the input sheets are in principle introduced (and moved) in the manner of a V. Since that process uses a heating element that is in principle nonmoving, in particular a heating rod, the input sheets have to be moved over the heating element. In contrast to that, in the process of the invention the heating element is moved between the input sheets, which—at this stage of the process—are in principle nonmoving. Movement of the input sheets in the process of the invention does not in principle occur before removal of the heating elements from the space between the sheets, where the input sheets to be welded are bonded to one another via movement of at least one of the input sheets. The process of the invention can thus without difficulty produce thermoplastic foam sheets of any desired thickness having three or more layers.

A further advantage of the process of the invention is considered to be that it is in principle possible to achieve very short repositioning times. The expression "repositioning times" in the invention means the time that expires between heating and, respectively, melting of the foam surface and the joining of the heated and, respectively, melted foam surface. In the process of the invention this is therefore the period which begins with the introduction of at least two heating elements according to step b) and ends with the joining of the corresponding input sheets according to step e). A short repositioning time can in particular be achieved because the heating elements are movable in the context of a contactless welding process.

As already mentioned above, the homogeneity and, respectively, the thickness of the welds between the input sheets has an advantageous effect on flammability performance (improved flame retardancy) of the product obtained by using the process of the invention. The at least two-layer thermoplastic foam sheets produced by the process of the invention preferably pass the B2 fire test (in accordance with DIN 4102-1: 1998-05). This means that for the purposes of the present invention it is possible to avoid the wicking effect, in particular in the B2 fire test, so that the weld in the at least two-layer thermoplastic foam sheets of the invention withstands the B2 fire test.

For the purposes of the present invention, this is preferably achieved in that the thickness of the weld formed between two input sheets during the thermal welding of said input sheets is (on average) from 30 to 200 μm. The thickness of the weld can be controlled in the invention in particular via the separation of the heating elements from the input sheets to be welded, the temperature of the heating elements, and also the velocity at which the heating elements are conducted into, and also out from, the intermediate space between the input sheets. If by way of example a three- or multilayer thermoplastic foam sheet is produced, it is preferable that the thickness of all of the welds formed between the individual sheet pairs is (on average) from 30 to 200 μm, where the corresponding thicknesses can also vary between the individual sheet pairs. The at least two-layer thermoplastic foam sheets per se moreover have high tensile strength, preferably >0.15 N/mm$^2$.

Particularly stable coherence of the individual thinner thermoplastic foam sheets is achieved when these are heated to temperatures above the glass transition temperature or melting point of the thermoplastic used. The individual thinner thermoplastic foam sheets are then preferably additionally pressed with one another. The at least two-layer thermoplastic foam sheets produced by the process of the invention, in particular those where the surfaces of the foam sheets are heated to temperatures above the glass transition temperature, have another advantageous property: the thermally welded foam sheets have high water-vapor transmission and/or high strength.

Insofar as the process of the invention is carried out with use of an absorber of electromagnetic radiation, where the absorber is applied to the corresponding surfaces of the thinner thermoplastic foam sheets which are thermally welded to one another, another advantage is considered to be that the permeability of the at least two-layer thermoplastic foam sheets to radiation is per se reduced, and/or the thermal conductivity performance can be improved. Thermal conductivity can be reduced by up to 10% in comparison with conventional sheets where no absorber of electromagnetic radiation is used. A reduction of thermal conductivity means a (thermal) insulation effect.

The process of the invention for the production of an at least two-layer thermoplastic foam sheet is defined in more detail below.

The thermoplastic foam sheet produced by the process of the invention has at least two layers; it can therefore have precisely two layers, or can have three, four, five, or even more layers. As already described above, the number of layers of the thermoplastic foam sheet results per se from the number of the thinner thermoplastic foam sheets that are thermally welded to one another. The thinner thermoplastic foam sheets are also termed input sheets. In the case of a two-layer thermoplastic foam sheet per se, two thinner thermoplastic foam sheets are therefore thermally welded to one another. In the case of a three- or four-layer thermoplastic foam sheet per se, three and, respectively, four thinner thermoplastic foam sheets are therefore thermally welded to one another. Insofar as the intention is to produce thermoplastic foam sheets which per se have even more layers, an example being a ten-layer thermoplastic foam sheet, the number of thinner thermoplastic foam sheets that are to be thermally welded to one another must accordingly correspond to the number of layers, for example ten thinner thermoplastic foam sheets. The thermoplastic foam sheet of the invention preferably has two, three, or four layers, and in particular the thermoplastic foam sheet of the invention has two layers. The thermal welding process per se (method) is defined in more detail at a later stage below in the text in connection with the production process of the invention.

The thinner thermoplastic foam sheets used for the thermal welding process correspond in respect of their chemical composition to the at least two-layer thermoplastic foam sheets per se produced for the purposes of the present invention (ignoring the components optionally applied to the surfaces for the purposes of the welding procedure, for example absorbers of electromagnetic radiation, or flame retardants and, respectively, ignoring the chemical alterations/reactions occurring at the corresponding surfaces as a consequence of the formation of the weld). It is preferable that the respective thinner thermoplastic foam sheets to be thermally welded to one another have the same dimensions and/or the same chemical composition. However, it is optionally also possible that thinner thermoplastic foam sheets with different dimensions and/or with different chemical composition are thermally welded to one another. If by way of example three thinner thermoplastic foam sheets are thermally welded to one another, all of which have the same dimensions and (by way of example) are an extruded polystyrene foam (XPS foam), a three-layer thermoplastic extruded polystyrene foam (XPS) is thus obtained.

The thinner thermoplastic foam sheets to be thermally welded to one another can have any desired dimensions. In respect of their length and width they can have dimensions extending from the centimeter range as far as a plurality of meters. In respect of the third dimension (thickness), it is likewise theoretically possible to conceive of any desired dimensions, but in practice the thickness of the thinner thermoplastic foam sheets is from 10 to 300 mm. On the basis of a right-angled coordinate system in the invention the length of an input sheet and, respectively, of an at least two-layer thermoplastic foam sheet is also per se termed "x-direction", the corresponding width being termed "y-direction", and the thickness being termed "z-direction". As can be seen by way of example from FIG. 5c), the thickness of at least one of the input sheets thus welded rises continuously as the number of welding steps increases. FIG. 5c) depicts the case where a three-layer thermoplastic foam sheet is produced via welding of an individual thinner thermoplastic foam sheet 8 to a thermoplastic foam sheet 7 that already has two layers and that itself in turn represents an input sheet in relation to the desired three-layer thermoplastic foam sheet. The values stated above and below in respect of the thickness of a thinner thermoplastic foam sheet are based on the corresponding values for an input sheet that has not itself yet undergone any thermal welding step. Insofar as the intention is to use a thermoplastic foam sheet having two or more layers as input sheet for a further welding step in the sense of FIG. 5c), the thicknesses of the corresponding input sheets having two or more layers are correspondingly higher.

The thickness of the at least two-layer thermoplastic foam sheets produced in the process of the invention therefore result from the total thickness of the entirety of the thinner thermoplastic foam sheets (input sheets) used. By virtue of the thermal welding process, the respective surfaces to be welded to one another of the input sheets are at least somewhat melted or incipiently melted (melting step), and this can lead to a certain reduction of the thickness of the respective input sheet, depending on the amount of heat introduced. A weld forms at the locations at which the input sheets are thermally welded to one another. In particular when a pressing step and/or melting step is carried out with introduction of a large amount of heat for the purposes of the production process, the thickness of the at least two-layer thermoplastic foam sheets per se is smaller than the sum of the respective thicknesses of the thinner thermoplastic foam sheets used.

It is preferable that in step a) the length (x-direction) of the two thinner thermoplastic foam sheets is respectively from 500 to 2800 mm, preferably from 1000 to 1500 mm, and their width (y-direction) is from 500 to 1250 mm, preferably from 500 to 900 mm, and their thickness (z-direction) is from 20 to 200 mm, preferably from 50 to 100 mm.

The thinner thermoplastic foam sheets per se used for the thermal welding process are known in principle to the person skilled in the art. Suitable thermoplastic foam sheets are disclosed by way of example in EP-A1 566 490, or in the form of blends in WO 2009/047487. By way of example, it is possible to use sheets made of amorphous, crystalline, or semicrystalline thermoplastic foams.

It is preferable that the thinner thermoplastic foam sheets are a molded foam or an extruded foam. It is moreover preferable that the density of the thinner thermoplastic foam sheets is from 10 to 500 g/l, preferably from 15 to 200 g/l, in particular from 20 to 150 g/l. A preferred molded foam is Styropor®, which is available commercially from BASF SE. It is more preferable that the thinner thermoplastic foam sheets are an extruded foam. The extruded foam is preferably a polystyrene or a copolymer produced from styrene. It is optionally also possible to use mixtures of polymers of this type. It is particularly preferable that the extruded foam is extruded polystyrene (XPS) which is obtainable commercially by way of example as Styrodur® from BASF SE.

Insofar as the extruded foam is based on (at least) one copolymer produced from styrene (another term used being styrene copolymers), this means that the production of said copolymer requires at least one other monomer alongside the styrene monomer. It is preferable that said copolymer is produced from styrene and from one other monomer. Suitable comonomers for styrene are in principle any of the monomers polymerizable with styrene. It is preferable that there are at least 50% by weight of styrene copolymerized in said copolymer.

It is preferable that a copolymer produced from styrene comprises, as comonomer for styrene, a monomer selected from α-methylstyrene, ring-halogenated styrenes, ring-alkylated styrenes, acrylonitrile, acrylate, methacrylate, N-vinyl compounds, maleic anhydride, butadiene, divinylbenzene, and butanediol diacrylate. Acrylates and methacrylates are preferably obtainable from alcohols having from 1 to 8 carbon atoms. An example of a suitable N-vinyl compound is vinylcarbazole. Preferred copolymers produced from styrene are styrene-acrylonitrile copolymers (SAN) and acrylonitrile-butadiene-styrene copolymers (ABS).

The method for the thermal welding process per se is known to the person skilled in the art. The effect of the thermal welding process is achieved in the invention on the surfaces to be welded in that the respective surfaces of the input sheets are exposed to a heat source. The at least two heating elements which are introduced, on parallel-offset planes, and parallel to the two thinner thermoplastic foam sheets, into the corresponding intermediate space represent the heat source in the process of the invention.

The thermal welding process forms a weld between the surfaces to be welded (the input sheets). Other expressions that can also be used instead of the term "weld" are "weld skin" and "weld zone". For each input sheet pair to be welded, the thermal welding process forms one weld between the surfaces brought into contact with one another of the two input sheets. If by way of example a three-layer thermoplastic foam sheet is produced, three thinner thermoplastic foam sheets (input sheets) are used, and two welds are therefore formed. It is preferable that the thickness of at least one weld is from 30 to 200 µm. It is preferable that the thickness of each weld is from 30 to 200 µm, and in particular the thickness of each weld is the same (for example 100 µm). In the above example, the thickness of both welds in this preferred embodiment is in the range from 30 to 200 µm, and the thickness of the first weld here can be the same as or different from that of the second weld; it is preferable that the two values are identical.

The thickness of the weld is preferably from 50 to 150 µm, more preferably from 70 to 130 µm, in particular from 80 to 100 µm. The numeric values listed for the thickness of a weld for the purposes of the present invention are to be understood as average value, and it is preferable here to determine this average value by using five measurement locations distributed over the entire length of the weld, with determination via optical microscopy. In the invention, the abovementioned values in respect of the thickness of the weld extend across the entire area of the weld.

The values in respect of cell size and/or average cell number of the thermoplastic foam sheets of the invention and, respectively, of the corresponding input sheets can be as desired. The respective values of the input sheets are also in turn found in the thermoplastic foam sheets of the invention, and they are therefore not altered by the thermal welding process. It is however preferable that the cell size of the thermoplastic foam sheet is <150 µm, with preference <80 µm, and/or that the average cell number is >6 cell/mm. While input sheets with average cell size 200 µm and above have increased surface roughness and coarse cell structure, in particular input sheets with average cell size <150 µm, preferably <80 µm, have a very fine structure and a smooth surface, and this has an advantageous effect on the fire test results and on thermal insulation capability.

In step a) of the process of the invention, two thinner thermoplastic foam sheets are oriented parallel to one another with a separation a in such a way that they form an intermediate space.

The separation a here is selected in such a way that at least two heating elements can be moved between the corresponding input sheets in parallel-offset planes in such a way that they do not touch the surfaces of the corresponding input sheets (see also description relating to the subsequent step b)). The heating elements here also have a certain separation from one another, in order to ensure frictionless introduction and removal of the heating elements. The separation a increases as the number of heating elements that are introduced into, and removed from, the intermediate space on parallel-offset planes is increased in the process of the invention.

The separation a in step a) is preferably from 10 to 150 mm, in particular from 15 to 80 mm.

Figure 1:
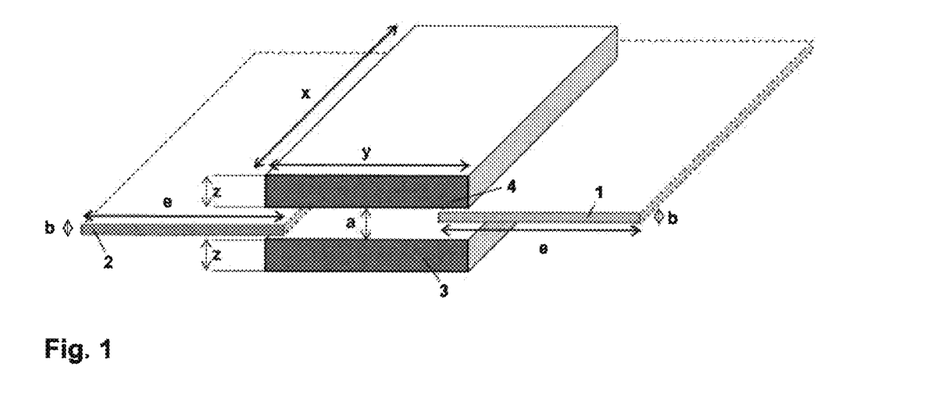

FIG. 1 illustrates the parallel orientation of the input sheets according to step a). The two thinner thermoplastic foam sheets (input sheets) are indicated by reference signs "3" and "4" in the figure. "x" represents the respective length of the input sheet (preferably from 500 to 2800 mm), "y" is the width of the input sheets, preferably from 500 to 1250 mm, and "z" is the thickness of the input sheets, preferably from 50 to 100 mm. The two input sheets 3 and 4 are oriented parallel to one another with a separation a, which is preferably from 10 to 150 mm.

In step b) of the process of the invention, at least two heating elements are introduced into the intermediate space on parallel-offset planes, and parallel to the two thinner thermoplastic foam sheets, and the surfaces of the two thinner thermoplastic foam sheets here do not touch the heating elements.

Figure 2:
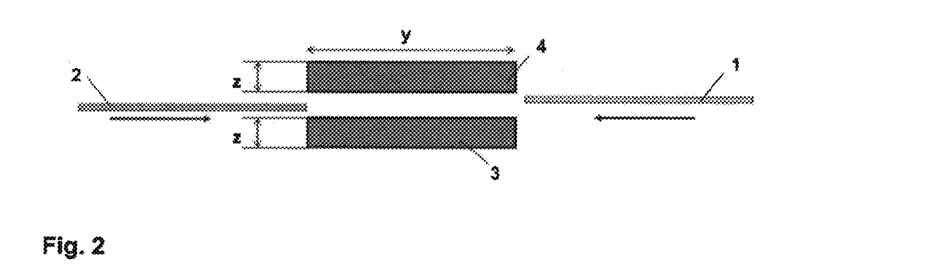

Heating elements used in the invention can be any of the heating elements known to the person skilled in the art which are movable and permit contactless welding for the purposes of the present invention. It is preferable in the invention to use two heating elements, and it is moreover preferable that the heating elements are heating plates. Insofar as more than two heating elements are used, it is preferable to use an even number of heating elements on parallel-offset planes. Preferred heating plates are IR sources with surface temperature from 200 to 1000° C., in particular from 300 to 700° C. By way of example, they can be preheated in the external position (non-operative position), or can be heated electrically by way of resistance heating systems, or by means of hot fluids. FIG. 2 depicts this type of external position (non-operative position or park position) for the two heating plates 1 and 2. The external position is therefore interpreted to mean the positioning of the heating elements outside of the intermediate space defined in the preceding step between the two input sheets. As can be seen from FIG. 2, the two heating elements 1 and 2, preferably heating plates, are introduced in the direction of the arrow into said intermediate space between the input sheets (see also FIG. 3 and FIG. 1).

It is preferable in the invention to use two identical heating elements, in particular heating plates, but the heating elements can also optionally be of different type in respect of their properties, in particular thickness. The dimensions of the heating elements are selected with reference to the corresponding dimensions of the input sheets to be welded. In principle, the length (x-direction), width (y-direction), and also thickness (z-direction) of the heating elements can be respectively greater and/or smaller than the corresponding dimensions of the input sheets to be welded. It is preferable that the length (x-direction) of the heating elements, in particular heating plates, is respectively the same as or at most 10% greater than the corresponding lengths (x-direction) of the two thinner thermoplastic foam sheets, and that the width (y-direction) of the heating elements is from 30 to 100%, preferably from 60 to 80%, of the corresponding width (y-direction) of the two thinner thermoplastic foam sheets. FIG. 1 uses "e" for the width of a heating plate, which by way of example can be from 250 to 1400 mm. FIG. 1 uses "b" for the thickness of the heating plates; the thickness of the two heating plates 1 and 2 is preferably from 5 to 50 mm.

In step c) of the process of the invention the heating elements are introduced between the two thinner thermoplastic foam sheets to an extent such that, in relation to every location on the respective surface of the two thinner thermoplastic foam sheets, at least one of the heating elements has been present at least temporarily between the two thinner thermoplastic foam sheets.

Figure 3:
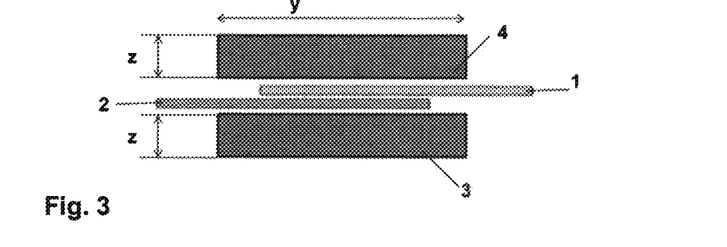

FIG. 3 depicts step c). As can be seen from FIG. 3, each location (point or region) of the respective surface of the respective input sheets 3 and 4 is close to at least one of the two heating elements 1 and 2. In other words, at every location at least one of the two heating elements is between the two input sheets.

Figure 4:
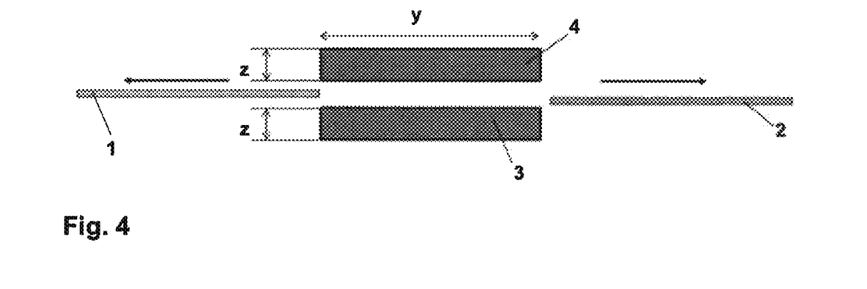

In step d) the heating elements are completely removed from the intermediate space. This is depicted in FIG. 4. The removal of the heating elements in the invention preferably takes place in the same direction as the introduction of the heating elements in step b). As can be seen from the two-dimensional representation according to FIGS. 2 to 4, the heating element 1 is conducted from right to left through the intermediate space between the two input sheets, while the heating element 2 is conducted in precisely opposite direction from left to right.

In step e) at least one of the two thinner thermoplastic foam sheets is forced against the surface of the respective other thinner thermoplastic foam sheet.

This step is explained below for horizontal arrangement of the two thinner thermoplastic foam sheets. The principles of the description also apply to vertical orientation of the two thinner thermoplastic foam sheets.

Figure 5:
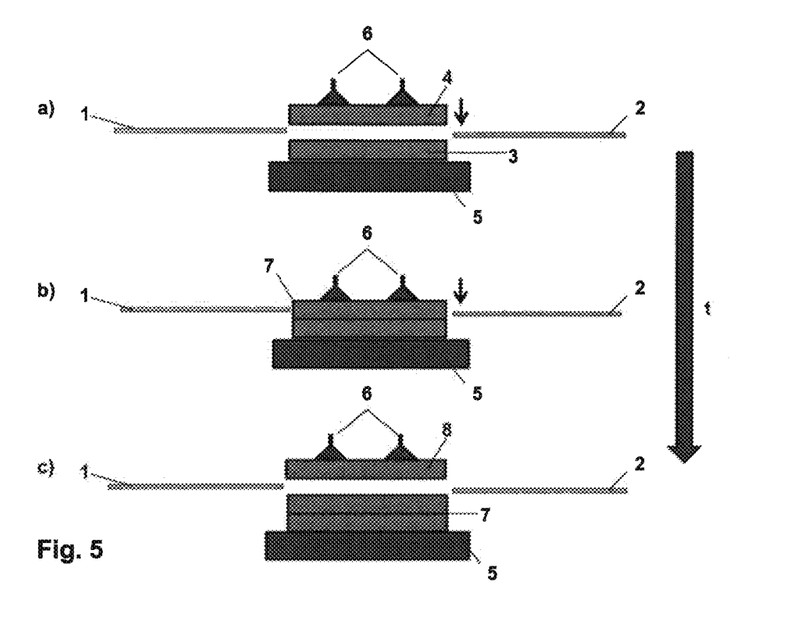

In principle it is conceivable that both input sheets are forced against one another in step e), i.e. are moved toward one another until the separation a is equal to zero. However, it is preferable in the invention that only one of the two input sheets is forced against the respective other input sheet. This is depicted in FIGS. 5a) and 5b). If the three-dimensional arrangement of the input sheets is horizontal (as depicted in FIGS. 2 to 5), it is preferable that the input sheet 4 that is in three-dimensional terms the upper sheet is forced against the lower input sheet 3. This is preferably achieved with use of an appropriate gripper device 6 which can not only raise the input sheets but also, by applying pressure, move them toward the lower sheets. As depicted in FIG. 5, the lower input sheets 3 can lie on a lowering device 5 which, as depicted in FIG. 5c), can be moved appropriately downward during the production of thermoplastic foam sheets having a larger number of layers. However, the design of the device 5 can optionally also be such that it can also be used to apply pressure to the input sheet 3 in the direction of the input sheet 4. However, it is preferable that the device 5 is not moved during the conduct of the steps a) to e) of the invention. Lowering of the device 5 takes place, as depicted in FIG. 5c), only prior to the repetition of the steps a) to e) with the aim of producing a thermoplastic foam sheet having three or more layers. The input sheet currently having two layers is indicated by "7" in FIG. 5c), while "8" indicates the new thinner input sheet. The input sheets 4 and 8 are generally identical.

It is moreover preferable that for the purposes of step e) in the process of the invention the joined thin thermoplastic foam sheets to be thermally welded are pressed. The pressing process generally takes from seconds to minutes, and/or uses a pressure of from 0.01 to 0.5 bar, preferably from 0.1 to 0.5 bar.

It is moreover preferable that in step e) of the process of the invention at least one of the two thinner thermoplastic foam sheets is forced against the surface of the respective other thinner thermoplastic foam sheet, and that at least one of the two thinner thermoplastic foam sheets is vibrated or rotated. This is also termed "vibration welding".

The invention comprises introducing, in step b), two heating elements from respectively mutually opposite directions into the intermediate space, and/or in turn removing, in step d), two heating elements in respectively mutually opposite directions from the intermediate space. This is depicted in FIGS. 2 to 5, according to which the two heating elements 1 and 2, preferably heating plates, are introduced respectively in mutually opposite direction into the intermediate space, and this direction of movement is also retained during removal, as is particularly preferred for the purposes of the process of the invention.

The invention preferably comprises introducing, in step b), two-heating elements from respectively mutually opposite directions into the intermediate space, in turn removing two heating elements in step d) in respectively mutually opposite directions from the intermediate space.

The process of the invention can be carried out either with horizontal or else with vertical orientation of the heating elements. However, preference is given to the vertical embodiment (based in each case on three-dimensional space).

It is preferable in the invention that the heating elements in the steps b) and d) are moved with a velocity of from 0.1 to 5 m/s, preferably from 0.3 to 3 m/s.

In another preferred embodiment of the present invention, the heating elements are moved parallel to the xy-plane and along the y-direction (width) of the two thinner thermoplastic foam sheets.

It is moreover preferable in the invention that in the steps b) to d) the separation between the surface of each of the two thinner thermoplastic foam sheets and the surface of the heating element that is respectively spatially closest thereto is from 0.5 to 25 mm, preferably from 1 to 10 mm.

It is moreover preferable that in the process of the invention the repositioning time is kept short. This means that the total duration of the steps b) to e) is at most 20 seconds, preferably at most 10 seconds, in particular at most 5 seconds.

It is moreover preferable that the process of the invention is carried out in a thermally insulated enclosure, and a temperature that is constant within +/−10° C. is maintained in the range from 40 to 200° C., preferably from 50 to 100° C., in the thermal enclosure.

It is preferable that the thermoplastic foam sheets of the invention are produced from input sheets that are at least to some extent foaming-skin-free, and this means that in each sheet pair to be welded in the thermal welding process at least one, preferably both, of the surfaces to be thermally welded of the thinner thermoplastic foam sheets (input sheets) is/are foaming-skin-free. For the purposes of the present invention, the expression "foaming-skin-free" means that the foaming skin produced during the process for production of the respective thermoplastic foam sheet is removed by way of example by planing or milling. In the interests of completeness, it should be noted that when an extruded foam is used another expression is used for the corresponding surface: extrusion-skin-free instead of foaming-skin-free.

It is moreover preferable for the purposes of the present invention that heating is carried out to temperatures above the glass transition temperature and/or melting point of the thermoplastic foam sheet. It is preferable that the thermal welding process is carried out at temperatures which are from 50 to 300° C. above the glass transition temperature in the case of amorphous thermoplastic foams, or which are from 50 to 100° C. above the melting point in the case of semicrystalline thermoplastic foams.

The thermoplastic foam sheets produced by the process of the invention can comprise additional substances/compounds with specific usage properties, for example flame retardants or absorbers of electromagnetic radiation. These additional substances are applied in the invention before the thermal welding process to at least one surface of the input sheets to be thermally welded, and it is preferable that these substances are applied to both surfaces of the input sheets of each sheet pair to be welded.

In one embodiment of the present invention, the thermoplastic foam sheets produced by the process of the invention comprise at least one flame retardant. Flame retardants per se are known to the person skilled in the art. Preferred flame retardants for the purposes of the present invention are selected from a phosphate, a phosphite, a phosphonate, a polyphosphonate, melamine, a metal oxide hydrate, in particular an aluminum oxide hydrate, or a halogenated organic compound. The abovementioned flame retardants, preferably the phosphorus-containing flame retardants, but not the halogenated organic compounds, are preferably applied before the thermal welding process directly onto at least one surface (per sheet pair) of the input sheets to be welded.

Preferred phosphates and phosphonates are selected from DMMP (dimethyl methylphosphonate), DMPP (dimethyl propylphosphonate), TCEP (tris(chloroethyl) phosphate), TCPP (tris(chloropropyl) phosphate), TDCPP (tris(dichloroisopropyl) phosphate), TPP (triphenyl phosphate), TEHP (tris(2-ethylhexyl) phosphate), TKP (tricresyl phosphate), and TCEP (trichloropropyl phosphate).

Preferred halogenated organic compounds are bromine-containing organic compounds, and particular preference is given to HBCD (hexabromocyclododecane) or brominated polystyrenes. Brominated polystyrenes are obtainable commercially, for example from Emerald, Great Lakes. Quantities used of these are preferably from 0.5 to 5% by weight (based on the input sheet). Insofar as halogenated organic compounds are used as flame retardants, they are preferably used during the process of production of the input sheets, and this means that the flame retardant has uniform distribution over the entire thickness of the respective input sheet.

A particularly preferred flame retardant is dimethyl propylphosphonate (DMPP), which is by way of example obtainable commercially as Levagard DMPP from Lanxess. In one embodiment of the present invention preference is given to expandable graphite, which can likewise be used as absorber.

Insofar as a flame retardant is used in the invention it is preferable that the thermal welding process is carried out in the presence of at least one flame retardant and that, in each sheet pair to be welded, quantities of more than 5 g/m$^2$ of the flame retardant are applied to at least one, preferably to both surfaces to be thermally welded of the thinner thermoplastic foam sheets. It is preferable that quantities of more than 10 g/m$^2$ of the flame retardant, in particular of more than 15 g/m$^2$, are applied to both surfaces to be thermally welded.

In one preferred embodiment of the present invention, the thermal welding process is carried out in the presence of at least two flame retardants, where from 0.5 to 5% by weight of at least one halogenated organic compound are introduced into the input sheets during the production thereof. Prior to the thermal welding process, at least one further flame retardant, preferably a phosphorus-containing flame retardant, is applied, in each sheet pair, to at least one surface to be thermally welded of the input sheets, preferred quantities applied here being more than 10 g/m$^2$. After the welding procedure, most (i.e. more than 90%) of the further flame retardant is therefore present in the vicinity of the weld of the thermoplastic foam sheet.

The thermoplastic foam sheets produced by the process of the invention can moreover comprise at least one absorber of electromagnetic radiation (also termed "absorber" in the text below). It is preferable that the absorber of electromagnetic radiation is used in the form of dispersion, in particular in the form of aqueous dispersion. The method of application to the sheet surface can by way of example be brushing, doctoring, rolling, spraying, or printing.

The quantity of absorber (solid) on a surface is normally from 0.01 g/m$^2$ to 100 g/m$^2$, preferably from 0.1 g/m$^2$ to 50 g/m$^2$, particularly preferably from 1 g/m$^2$ to 20 g/m$^2$. The absorber can be applied to one side or to both sides.

Absorbers of electromagnetic radiation per se are known to the person skilled in the art. Suitable susceptors for radio-frequency radiation are described in WO 2006/050013, WO 99/47621, and WO 012/1725. Preferred susceptors are polymeric ionomers.

Absorbers of other types of radiation are described by way of example on pages 9 to 11 in WO 2009/071499. For the purposes of the present invention it is preferable to select the absorber of electromagnetic radiation to be appropriate for the electromagnetic radiation used for the thermal welding process. If by way of example the thermal welding process uses microwave radiation, it is preferable to select an absorber of electromagnetic radiation which has good absorption capability in the wavelength range of microwaves.

Examples of suitable absorbers are organic IR absorbers, organic microwave absorbers, inorganic IR absorbers, and inorganic microwave absorbers.

For the purposes of this application, the expression IR absorber means a compound which when applied at a layer thickness of <50 μm exhibits 90% absorption at at least one wavelength of radiation in the wavelength range from 700 nm to 1000 μm. Preference is given to the wavelength range of from >700 nm to 20 μm, and also to the wavelengths 9.6 μm and 10.6 μm.

For the purposes of this application, the expression microwave absorber means a compound which absorbs microwaves in the wavelength range of from >1 mm to 1 m. Particular preference is given to the industrially relevant frequencies of 2.45 Ghz, 433-444 MHz, and 902-928 MHz.

It is preferable that the absorber of electromagnetic radiation is an infrared (IR) absorber and/or microwave absorber, in particular graphite or carbon black. It is moreover preferable that the electromagnetic radiation is IR radiation and/or microwave radiation.

It is optionally possible in the process of the invention to carry out a drying step, for example after an absorber of electromagnetic radiation has been applied to the surface of the thinner thermoplastic foam sheets. The drying is normally carried out for a period of from 10 minutes to 2 hours and/or at a temperature in the range of from 50 to 100° C.

As mentioned above, it is also possible to apply, to the surface to be welded of the appropriate thinner thermoplastic foam sheets, other substances with other usage properties, other than the flame retardant and/or the absorber of electromagnetic radiation. Suitable other substances can by way of example be binders, pH regulators, and also optionally solvents. Binders, pH regulators, and also solvents per se are known to the person skilled in the art.

In one embodiment of the present invention, a mixture which comprises i) at least one absorber of electromagnetic radiation, ii) at least one binder, and/or iii) at least one flame retardant is applied on at least one surface of at least one thinner thermoplastic foam sheet.

For the purposes of the present invention, suitable binders are selected from polyacrylates and copolymers thereof, polystyrene and copolymers thereof, ethylene/acrylate copolymers, ethlyene/vinyl acetate copolymers, polyurethanes, and polyurethane/acrylate hybrids. Preferred copolymers of polystyrene are styrene/butadiene copolymers.

Preferred binders are selected from aqueous dispersions or solutions of polyacrylates and copolymers thereof, polystyrene and copolymers thereof, ethylene/acrylate copolymers, ethlyene/vinyl acetate copolymers, polyurethanes, and polyurethane/acrylate hybrids. Preferred copolymers of polystyrene are styrene/butadiene copolymers.

Particularly preferred binders are dispersions with a high proportion of polystyrene or copolymer thereof, in particular with a high proportion of polystyrene. These dispersions are preferably used when the thinner thermoplastic foam sheets (input sheets) in the process of the invention likewise comprise polystyrene or copolymers thereof because, by virtue of the use of said binder, there is then even less difference between the properties of the at least two-layer thermoplastic foam sheets (composite sheets) and those of the input sheets.

In another embodiment, the present invention provides a process for the production of an at least two-layer thermoplastic foam sheet via thermal welding of at least two thinner thermoplastic foam sheets comprising the following steps a) to e):

a) two thinner thermoplastic foam sheets are oriented parallel to one another with a separation a, in such a way that they form an intermediate space, b) at least two heating elements are introduced on parallel-offset planes, and parallel to the two thinner thermoplastic foam sheets, into the intermediate space, and the surfaces of the two thinner thermoplastic foam sheets here do not touch the heating elements, c) the heating elements are introduced between the two thinner thermoplastic foam sheets to an extent such that, in relation to every location on the respective surface of the two thinner thermoplastic foam sheets, at least one of the heating elements has been present at least temporarily between the two thinner thermoplastic foam sheets, d) the heating elements are in turn removed completely from the intermediate space, e) at least one of the two thinner thermoplastic foam sheets is forced against the surface of the respective other thinner thermoplastic foam sheet.

The descriptions and preferences set out above apply to the individual steps a) to e).

The invention is illustrated below by examples.

In all of the examples the thinner thermoplastic foam sheets ("starting sheets") are produced in the continuous extrusion process described in "Polystyrol, Kunststoffhandbuch 4" [Polystyrene, plastics handbook 4] [H. Gausepohl and R. Gellert, Hanser-Verlag Munich (1996)], in chapter 13.2.3 (pp. 591-598), in particular in figure 13.24, upper part. In each case, two starting sheets (Styrodur 3035 CS, density 35 g/l, thickness 50 mm, size (length×width) 120×50 $cm^2$) were welded with the use of two heating elements two weeks after said sheets had been produced. In the case of the examples using starting sheets having no foaming skin, the foaming skin was removed from the starting sheets about 24 hours before the welding process by planing 3 mm from the surface to be welded. The thickness of the starting sheets is then about 47 mm.

Table 1 below provides a more detailed description of the processes used for the various experiments. The expression "introduction of the two heating elements" means the introduction of the two heating elements into the intermediate space between the two thinner thermoplastic foam sheets. The expression "removal of the two heating elements" means the removal of the two heating elements from the intermediate space between the two thinner thermoplastic foam sheets.

TABLE 1

| Experiment | Surface of the two starting sheets | Introduction of the two heating elements | Removal of the two heating elements |
|---|---|---|---|
| 1a | with foaming skin | on mutually offset planes from opposite direction | with retention of direction |
| 1b | with foaming skin | on mutually offset planes from opposite direction | with reversal of direction |
| 2a | without foaming skin | on mutually offset planes from opposite direction | with retention of direction |
| 2b | without foaming skin | on mutually offset planes from opposite direction | with reversal of direction |
| 3 (comp.) | without foaming skin | on one plane from opposite direction | with reversal of direction |
| 4a (comp.) | without foaming skin | on mutually offset planes from same direction | with retention of direction |
| 4b (comp.) | without foaming skin | on mutually offset planes from same direction | with reversal of direction |

"comp." in table 1 and in table 2 means "comparative example"

The thickness of the weld is determined by using a scopeEye digital incident-light microscope with approximately 60× magnification.

The welded two-layer thermoplastic foam sheets are tested for tensile strength in the plane of the sheet in accordance with DIN EN 1607: 2013-05, and for fire performance to B2 in accordance with DIN 4102-1: 1998-05. Flame application in the fire test occurs directly at the weld.

All of the values measured are tested at three positions on the welded two-layer thermoplastic foam sheets. The distance of each of the three positions from the edge of the foam sheets, in the direction of the width of the welded two-layer thermoplastic foam sheets, was 250 mm. The following applies to the three positions in the direction of the length of the foam sheets:

Position 1: distance 200 mm from one edge of the foam sheets and 1000 mm from the other edge of the foam sheets Position 2: distance 400 mm from position 1; this corresponds to a distance of 600 mm from both edges of the foam sheets Position 3: distance 400 mm from position 2 and therefore 800 mm from position 1; this corresponds to a distance of 1000 mm from one edge of the foam sheets and 200 mm from the other edge of the foam sheets

TABLE 2

| | Position 1 | | | Position 2 | | | Position 3 | | |
|---|---|---|---|---|---|---|---|---|---|
| Experiment | Tensile strength ($N/mm^2$) | Thickness of weld (μm) | B2 test (DIN 4102) | Tensile strength ($N/mm^2$) | Thickness of weld (μm) | B2 test (DIN 4102) | Tensile strength ($N/mm^2$) | Thickness of weld (μm) | B2 test (DIN 4102) |
| 1a | 0.17 | 200 | passed | 0.20 | 180 | passed | 0.17 | 200 | passed |
| 1b | 0.16 | 190 | passed | 0.05 | 190 | passed | 0.15 | 170 | passed |
| 2a | 0.17 | 160 | passed | 0.16 | 130 | passed | 0.18 | 140 | passed |
| 2b | 0.16 | 150 | passed | 0.1 | 160 | passed | 0.18 | 170 | passed |

TABLE 2-continued

| Experiment | Position 1 | | | Position 2 | | | Position 3 | | |
|---|---|---|---|---|---|---|---|---|---|
| | Tensile strength (N/mm$^2$) | Thickness of weld (μm) | B2 test (DIN 4102) | Tensile strength (N/mm$^2$) | Thickness of weld (μm) | B2 test (DIN 4102) | Tensile strength (N/mm$^2$) | Thickness of weld (μm) | B2 test (DIN 4102) |
| 3 (comp.) | 0.12 | 220 | failed | 0.05 | 250 | failed | 0.18 | 300 | failed |
| 4a (comp.) | 0.12 | 400 | failed | 0.1 | 300 | failed | 0.13 | 250 | failed |
| 4b (comp.) | 0.13 | 350 | failed | 0 | 500 | failed | 0.09 | 300 | failed |

Inventive examples 1a, 1b, 2a, and 2b clearly show that a technical effect results from the introduction of at least two heating elements on parallel-offset planes from mutually opposite directions in the intermediate space between the two thinner thermoplastic foam sheets. The weld in the inventive examples is thinner than the welds obtained with the processes described in the prior art (comparative examples 3, 4a and 4b). The at least two-layer thermoplastic foam sheets produced in the invention moreover pass the B2 fire test in accordance with DIN 4102-1: 1998-05. Furthermore, the process of the invention generally achieves higher tensile strength values.

The invention claimed is:

1. A process for the production of an at least two-layer thermoplastic foam sheet via thermal welding of at least two thinner thermoplastic foam sheets, comprising the following steps a) to e):
  a) two thinner thermoplastic foam sheets are oriented parallel to one another with a separation a, in such a way that they form an intermediate space,
  b) at least two heating elements are introduced on parallel-offset planes, and parallel to the two thinner thermoplastic foam sheets, into the intermediate space, and the surfaces of the two thinner thermoplastic foam sheets here do not touch the heating elements,
  c) the heating elements are introduced between the two thinner thermoplastic foam sheets to an extent such that, in relation to every location on the respective surface of the two thinner thermoplastic foam sheets, at least one of the heating elements has been present at least temporarily between the two thinner thermoplastic foam sheets,
  d) the heating elements are removed completely from the intermediate space,
  e) at least one of the two thinner thermoplastic foam sheets is forced against the surface of the respective other thinner thermoplastic foam sheet
  where, in step b), two heating elements are introduced from, in each case, mutually opposite directions into the intermediate space or, in step d), two heating elements are in turn removed in, in each case, mutually opposite directions from the intermediate space.

2. The process according to claim 1, wherein the thickness of the weld formed via the thermal welding process is from 30 to 200 μm.

3. The process according to claim 2, wherein the thickness is from 80 to 100 μm.

4. The process according to claim 1, wherein the thinner thermoplastic foam sheet is a molded foam or an extruded foam.

5. The process according to claim 4, wherein the thinner thermoplastic foam sheet is an extruded foam made of polystyrene or made of a copolymer produced from styrene.

6. The process according to claim 1, wherein the thermoplastic foam sheet comprises at least one flame retardant.

7. The process according to claim 6, wherein the flame retardant is selected from a phosphate, a phosphite, a phosphonate, a polyphosphonate, melamine, an aluminum oxide hydrate, or a halogenated organic compound.

8. The process according to claim 1, wherein two heating elements are used, or the heating elements are heating plates.

9. The process according to claim 8, wherein the two heating elements are IR sources with surface temperature from 200 to 1000° C.

10. The process according to claim 1, wherein, in each sheet pair to be welded, at least one and preferably both of the surfaces to be thermally welded of the thinner thermoplastic foam sheets are foaming-skin-free.

11. The process according to claim 1, wherein the thermal welding process is carried out at temperatures which are from 50 to 300° C. above the glass transition temperature in the case of amorphous thermoplastic foams, or which are from 50 to 100° C. above the melting point in the case of semicrystalline thermoplastic foams.

12. The process according to claim 1, wherein the heating elements in the steps b) and d) are moved with a velocity of from 0.1 to 5 m/s.

13. The process according to claim 1, wherein, in step b), two heating elements are introduced from respectively mutually opposite directions into the intermediate space, and, in step d), two heating elements are removed in respectively mutually opposite directions from the intermediate space.

14. The process according to claim 1, wherein the total duration of the steps b) to e) is at most 20 seconds.

15. The process according to claim 1, wherein, in step a), the length (x-direction) of the two thinner thermoplastic foam sheets is respectively from 500 to 2800 mm, and their width (y-direction) is from 500 to 1250 mm, and their thickness (z-direction) is from 20 to 200 mm.

16. The process according to claim 1, wherein the length (x-direction) of the heating elements is respectively the same as or at most 10% greater than the corresponding lengths (x-direction) of the two thinner thermoplastic foam sheets, and the width (y-direction) of the heating elements is from 30 to 100% of the corresponding width (y-direction) of the two thinner thermoplastic foam sheets.

17. The process according to claim 1, wherein the heating elements are moved parallel to the xy-plane and along the y-direction (width) of the two thinner thermoplastic foam sheets.

18. The process according to claim 1, wherein the density of the thermoplastic foam sheets is from 10 to 500 g/l.

19. The process according to claim 1, wherein the process is carried out in a thermally insulated enclosure, and a temperature that is constant within +/−10° C. is maintained in the range from 40 to 200° C. in the thermal enclosure.

20. The process according to claim 1, wherein, in the steps b) to d), the separation between the surface of each of the two thinner thermoplastic foam sheets and the surface of the respective heating element that is respectively spatially closest thereto is from 0.5 to 25 mm.

21. The process according to claim 1, wherein in step b), two heating elements are introduced from, in each case, mutually opposite directions into the intermediate space and, in step d), two heating elements are in turn removed in, in each case, mutually opposite directions from the intermediate space.

* * * * *